(12) United States Patent
Hirata et al.

(10) Patent No.: US 12,506,986 B2
(45) Date of Patent: Dec. 23, 2025

(54) IMAGING SENSOR AND IMAGING DEVICE WITH WIRINGS BETWEEN PORTIONS OF SIGNAL LINES

(71) Applicant: NIKON CORPORATION, Tokyo (JP)

(72) Inventors: Tomoki Hirata, Tokyo (JP); Daiki Ogura, Tokyo (JP); Shigeru Matsumoto, Sagamihara (JP); Masahiro Juen, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 246 days.

(21) Appl. No.: 18/031,047

(22) PCT Filed: Oct. 14, 2021

(86) PCT No.: PCT/JP2021/038119
§ 371 (c)(1),
(2) Date: Apr. 10, 2023

(87) PCT Pub. No.: WO2022/080467
PCT Pub. Date: Apr. 21, 2022

(65) Prior Publication Data
US 2023/0362513 A1    Nov. 9, 2023

(30) Foreign Application Priority Data

Oct. 14, 2020 (JP) ................ 2020-173026

(51) Int. Cl.
*H04N 25/766* (2023.01)
*H04N 25/78* (2023.01)
*H10K 39/32* (2023.01)

(52) U.S. Cl.
CPC .......... *H04N 25/766* (2023.01); *H04N 25/78* (2023.01); *H10K 39/32* (2023.02)

(58) Field of Classification Search
CPC ...... H04N 25/766; H04N 25/78; H04N 25/76; H04N 25/79
See application file for complete search history.

(56) References Cited

U.S. PATENT DOCUMENTS

| 2012/0098081 A1 | 4/2012 | Horiike et al. |
| 2017/0223292 A1 | 8/2017 | Ikeda et al. |

(Continued)

FOREIGN PATENT DOCUMENTS

| JP | 2008-263072 A | 10/2008 |
| JP | 2012-089739 | 5/2012 |

(Continued)

OTHER PUBLICATIONS

May 28, 2024 Office Action issued in Japanese Patent Application No. 2022-557458.

(Continued)

*Primary Examiner* — Nicholas G Giles
(74) *Attorney, Agent, or Firm* — Oliff PLC (57) ABSTRACT

An imaging sensor including: a plurality of photoelectric conversion units provided in a first direction and a second direction different from the first direction and configured to generate electric charges through photoelectric conversion; signal lines each of which is wired in the second direction and to which signals based on the electric charges generated by the photoelectric conversion units are output; and processing units configured to process the signals output to the signal lines, wherein, in a second region between a first region in which the plurality of photoelectric conversion units are provided in the first direction and the second direction and a plurality of the processing units, a plurality of the signal lines are adjacent to each other in at least one of the second direction and a third direction different from the first direction and the second direction.

38 Claims, 8 Drawing Sheets

(56) References Cited

U.S. PATENT DOCUMENTS

| | | |
|---|---|---|
| 2019/0043913 A1 | 2/2019 | Juen et al. |
| 2019/0371841 A1 | 12/2019 | Yamashita |
| 2020/0321383 A1* | 10/2020 | Jung .................... H04N 25/78 |

FOREIGN PATENT DOCUMENTS

| | | |
|---|---|---|
| JP | 2018-137603 | 8/2018 |
| JP | 2019-197940 A | 11/2019 |
| WO | 2016/013413 A1 | 1/2016 |
| WO | 2017/169478 | 10/2017 |

OTHER PUBLICATIONS

Jan. 11, 2022 International Search Report issued in International Patent Application No. PCT/JP2021/038119.
Jan. 11, 2022 Written Opinion issued in International Patent Application No. PCT/JP2021/038119.

* cited by examiner

FIG. 7

IMAGING SENSOR AND IMAGING DEVICE WITH WIRINGS BETWEEN PORTIONS OF SIGNAL LINES

TECHNICAL FIELD

The present invention relates to an imaging sensor and an imaging device.

Priority is claimed on Japanese Patent Application No. 2020-173026, filed Oct. 14, 2020, the content of which is incorporated herein by reference.

BACKGROUND ART

An imaging sensor having an AD conversion unit for each column is known. In the related art, miniaturization of an imaging sensor has been desired.

CITATION LIST

Patent Document

Patent Document 1

Japanese Unexamined Patent Application. First Publication No. 2019-197940

SUMMARY OF INVENTION

According to a first aspect, there is provided an imaging sensor including: a plurality of photoelectric conversion units provided in a first direction and a second direction different from the first direction and configured to generate electric charges through photoelectric conversion; signal lines each of which is wired in the second direction and to which signals based on the electric charges generated by the photoelectric conversion units are output; and processing units configured to process the signals output to the signal lines, wherein, in a second region between a first region in which the plurality of photoelectric conversion units are provided in the first direction and the second direction and a plurality of the processing units, a plurality of the signal lines are adjacent to each other in at least one of the second direction and a third direction different from the first direction and the second direction.

According to a second aspect, there is provided an imaging sensor including: a plurality of photoelectric conversion units provided in a first direction and a second direction different from the first direction and configured to generate electric charges through photoelectric conversion; signal lines each of which is wired in the second direction and to which signals based on the electric charges generated by the photoelectric conversion units are output; and processing units configured to process the signals output to the signal lines, wherein an interval between the plurality of signal lines in the second direction in a region provided with the plurality of photoelectric conversion units is different from that in a region between the plurality of photoelectric conversion units and the plurality of processing units.

According to a third aspect, there is provided an imaging device including: the imaging sensor according to the first or second aspect; and a generation unit configured to generate image data on the basis of a signal output from the imaging sensor.

DESCRIPTION OF EMBODIMENTS

First Embodiment

Figure 1:
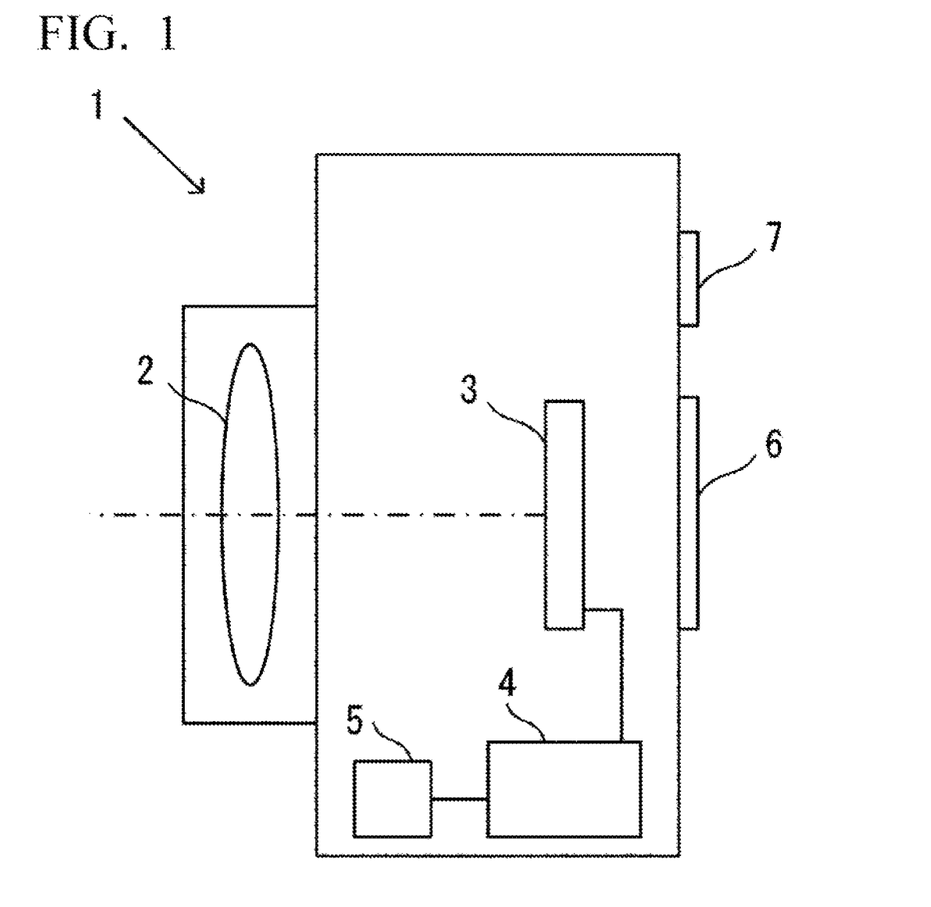
FIG. 1 is a diagram showing a configuration example of an imaging device according to a first embodiment.

FIG. 1 is a diagram showing a configuration example of a camera 1, which is an example of an imaging device according to a first embodiment. The camera 1 includes a photographing optical system (an image forming optical system) 2, an imaging sensor 3, a control unit 4, a memory 5, a display unit 6, and an operation unit 7. The photographing optical system 2 has a plurality of lenses including a focusing lens and an aperture diaphragm and forms a subject image on the imaging sensor 3. The photographing optical system 2 may be detachable from the camera 1.

The imaging sensor 3 is an imaging sensor such as a CMOS image sensor or a CCD image sensor. The imaging sensor 3 receives the light flux that has passed through the photographing optical system 2 and captures the subject image formed by the photographing optical system 2. In the imaging sensor 3, a plurality of pixels having photoelectric conversion units are disposed two-dimensionally (in a row direction and a column direction). The photoelectric conversion unit is constituted by a photodiode (PD). The imaging sensor 3 photoelectrically converts the received light to generate a signal and outputs the generated signal to the control unit 4.

The memory 5 is a recording medium such as a memory card. Image data, a control program, and the like are recorded in the memory 5. Writing data to the memory 5 and reading data from the memory 5 are controlled by the control unit 4. The display unit 6 displays an image based on image data, information related to photographing such as a shutter speed and a diaphragm value, a menu screen, and the like. The operation unit 7 includes a release button, various setting switches such as a power switch and a switch for switching various modes, and the like and outputs signals based on the respective operations to the control unit 4.

The control unit 4 is constituted by processors such as a CPU, FPGA, and ASIC and memories such as ROM and RAM and controls each unit of the camera 1 on the basis of a control program. The control unit 4 supplies a signal for controlling the imaging sensor 3 to the imaging sensor 3 to control the operation of the imaging sensor 3. The control unit 4 causes the imaging sensor 3 to capture a subject image and to output a signal in a case where still image photographing is performed, in a case where moving image photographing is performed, in a case where a through image (a live view image) of the subject is displayed on the display unit 6, or the like.

The control unit 4 performs various kinds of image processing on the signal output from the imaging sensor 3 to generate image data. The control unit 4 is also a generation unit 4 that generates image data, and generates still image data and moving image data on the basis of the signal output from the imaging sensor 3. The image processing includes image processing such as tone conversion processing or color interpolation processing.

Figure 2:
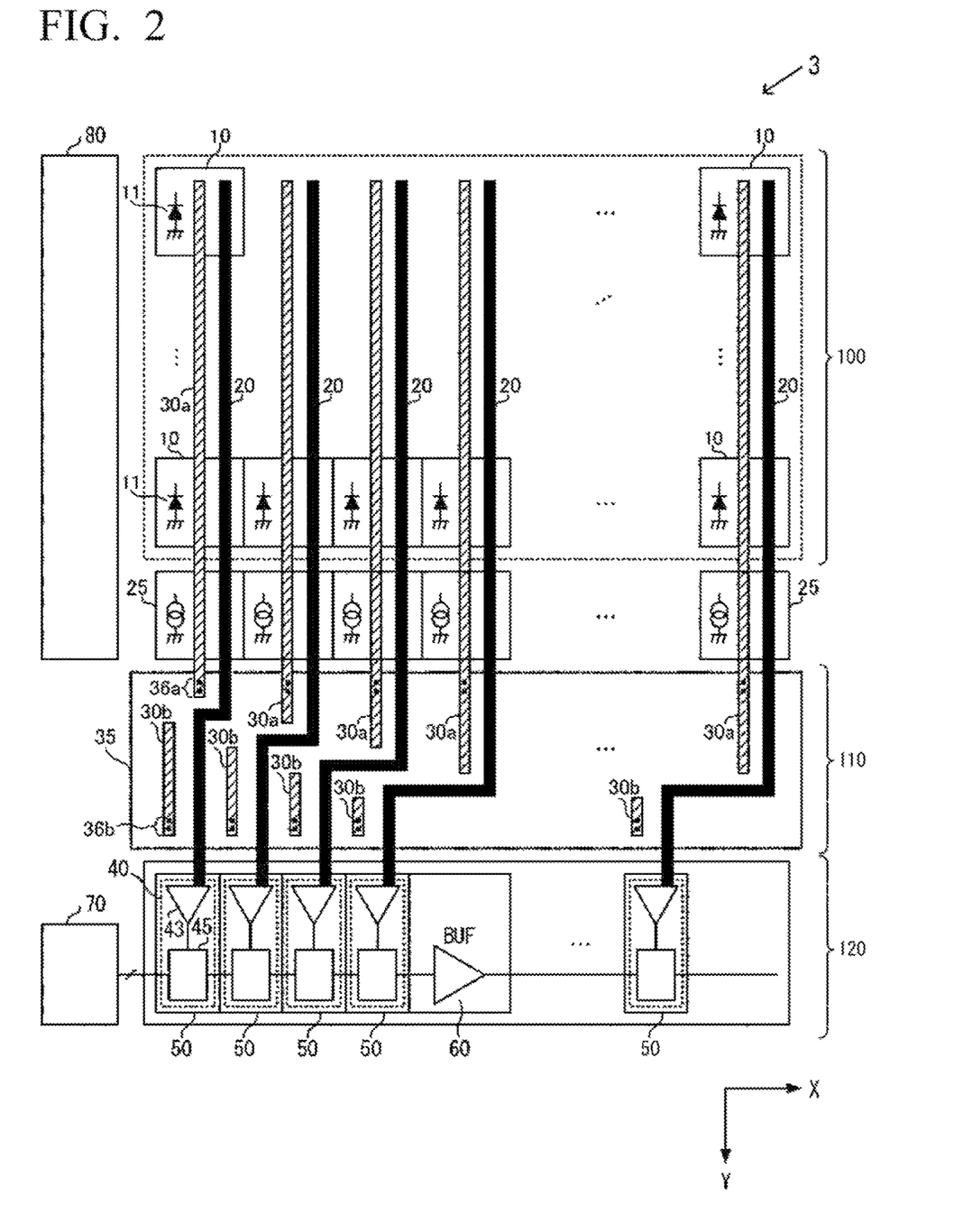
FIG. 2 is a block diagram showing a configuration example of an imaging sensor according to the first embodiment.

Next, the configuration of the imaging sensor 3 according to the present embodiment will be described with reference to FIGS. 2 and 3. FIG. 2 is a block diagram showing a configuration example of an imaging sensor according to the first embodiment. The imaging sensor 3 is formed using a substrate (a semiconductor substrate or the like) and has a plurality of layers including a wiring layer. A plurality of wirings, a plurality of vias, and the like are formed in the wiring layer. As shown in FIG. 2, the imaging sensor 3 has a region 100 in which pixels 10 are provided two-dimensionally, a region 120 in which processing units 50 for processing signals output from the pixels 10 are provided, and a region 110 between the region 100 and the region 120. Hereinafter, the region 100 will be referred to as a pixel region 100, the region 110 will be referred to as an intermediate region 110, and the region 120 will be referred to as a circuit region 120. FIG. 2 shows an arrangement example of a part of the imaging sensor 3, taking as an example a case where a pixel pitch (an interval between the pixels) is larger than a pitch between the processing units 50.

In the pixel region 100, the plurality of pixels 10 including the photoelectric conversion units 11 are disposed in a horizontal direction (an X-axis direction shown in FIG. 2) which is a first direction and a vertical direction (a Y-axis direction shown in FIG. 2) which is a second direction intersecting with the first direction. In the pixel region 100, a vertical signal line 20 is provided for each of the plurality of pixels 10 disposed in the horizontal direction (the row direction). It can also be said that the vertical signal line 20 is provided for a pixel column, which is a column of a plurality of pixels arranged in the vertical direction (the column direction). The vertical signal line is wired in the vertical direction in the pixel region 100. A current source 25 and the processing unit 50 are provided for the vertical signal line 20.

Figure 3:
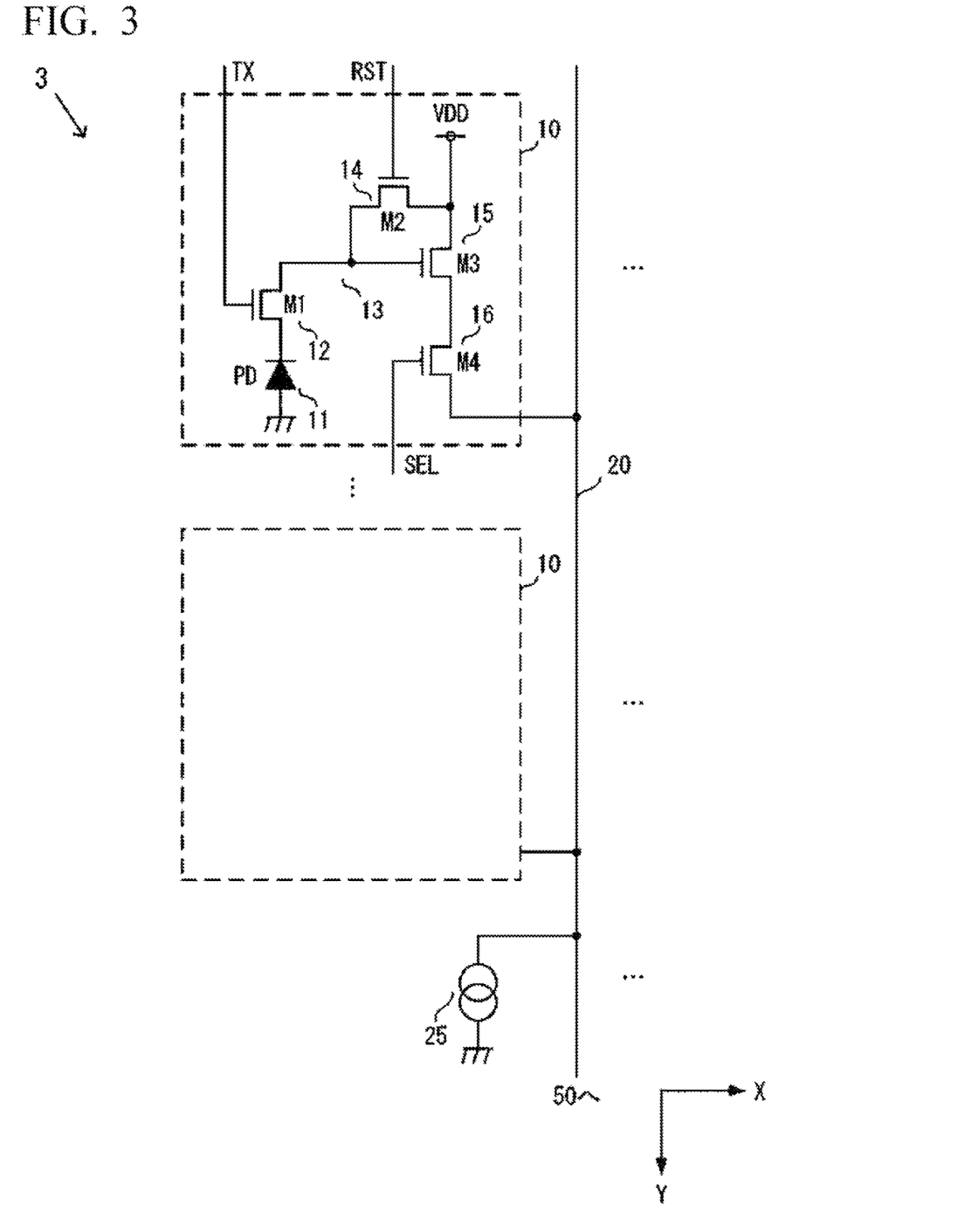
FIG. 3 is a diagram showing a configuration example of a part of the imaging sensor according to the first embodiment.

FIG. 3 is a diagram showing a configuration example of a part of the imaging sensor according to the first embodiment. The pixel 10 has the photoelectric conversion unit 11, a transfer unit 12, a floating diffusion (FD) 13, a resetting unit 14, an amplification unit 15, and a selection unit 16. The photoelectric conversion unit 11 is a photodiode PD that converts incident light into electric charges and accumulates the photoelectrically converted electric charges.

The transfer unit 12 is constituted by a transistor M1 controlled by a signal TX and transfers the electric charges photoelectrically converted by the photoelectric conversion unit 11 to the FD 13. The transistor M1 is a transfer transistor. The FD 13 accumulates (holds) the electric charges transferred to the FD 13 and converts the electric charges into a voltage by dividing the electric charges by a capacitance value. The FD 13 is an accumulation unit 13 that accumulates the electric charges generated by the photoelectric conversion unit 11.

The amplification unit 15 is constituted by a transistor M3 of which a gate (a terminal) is connected to the FD 13 and amplifies a signal based on the electric charges accumulated in the FD 13 for outputting. A drain (a terminal) and a source (a terminal) of the transistor M3 are connected to a power supply VDD and the selection unit 16, respectively. The source of the amplification unit 15 is connected to the vertical signal line 20 via the selection unit 16. The amplification unit 15 functions as a part of a source follower circuit using the current source 25 as a load current source. The transistor M3 is an amplification transistor. The amplification unit 15 and the selection unit 16 constitute an output unit that generates a signal based on the electric charges generated by the photoelectric conversion unit 11 for outputting.

The resetting unit 14 is constituted by a transistor M2 controlled by a signal RST and resets the electric charges accumulated by the FD) 13. The resetting unit 14 discharges the electric charges accumulated in the FD 13 and resets the voltage of the FD 13. The transistor M2 is a resetting transistor. The selection unit 16 is constituted by a transistor M4 controlled by a signal SEL and electrically connects or disconnects the amplification unit 15 and the vertical signal line 20 to or from each other. The transistor M4 of the selection unit 16 outputs a signal from the amplification unit 15 to the vertical signal line 20 in an ON state. The transistor M4 is a selection transistor.

The current source 25 is connected to each pixel 10 via the vertical signal line 20. The current source 25 generates a current for reading out a signal from the pixel 10 and supplies the generated current to the vertical signal line 20 and each pixel 10. The current source 25 is provided for each vertical signal line 20, and a plurality of current sources 25 are disposed in the horizontal direction as shown in FIG. 2.

As described above, the electric charges photoelectrically converted by the photoelectric conversion unit 11 are transferred to the FD 13 by the transfer unit 12. A signal (a pixel signal) corresponding to the electric charges transferred to the FD 13 is output to the vertical signal line 20. The pixel signal output from the pixel 10 is an analog signal generated on the basis of electric charges photoelectrically converted by the photoelectric conversion unit 11.

In FIG. 2, a readout control unit 80 is commonly provided for the plurality of pixels 10. The readout control unit 80 is constituted by a plurality of circuits including a timing generator. The readout control unit 80 is controlled by the control unit 4 of the camera 1, supplies signals such as the signal TX, the signal RST, and the signal SEL described above to each pixel 10, and controls the operation of each pixel 10. The readout control unit 80 supplies the signals to the gate of each transistor of the pixel 10 to make the transistor an on state (a connected state, a conductive state, or a short-circuited state) or an off state (a disconnected state, a non-conductive state, an open state, or a cutoff state). The pixel signal of the pixel 10 selected by the readout control unit 80 is output to the vertical signal line 20 connected to the pixel 10.

In the circuit region 120, a plurality of processing units 50 including analog/digital conversion units (AD conversion units) 40 are disposed in the horizontal direction. Further, a buffer 60 is disposed for every the plurality of processing units 50 arranged in the horizontal direction (for every four processing units 50 in FIG. 2). The size of the processing unit 50 in the horizontal direction and the size of the pixel 10 in the horizontal direction are different from each other. In the example shown in FIG. 2, the width (the width in the horizontal direction) of the pixel 10 is larger than the width (the width in the horizontal direction) of the processing unit 50.

The pixel signal, which is an analog signal, is input to the processing unit 50 from each pixel 10 via the vertical signal line 20. The processing unit 50 may have an amplification unit that amplifies the pixel signal input via the vertical signal line 20 with a predetermined gain (an amplification factor). In this case, the pixel signal amplified by the amplification unit is input to the AD conversion unit 40. A counter 70 shown in FIG. 2 is commonly provided for the plurality of processing units 50. The counter 70 generates a clock signal indicating a count value and outputs the clock signal to each of the AD conversion units 40 arranged in the horizontal direction.

The AD conversion unit 40 has a comparison section 43 and a storage section 45 and converts the pixel signal input via the vertical signal line 20 into a digital signal having a predetermined number of bits. The comparison section 43 is configured including a comparator circuit. The comparison section 43 compares the signal output from the pixel 10 with a reference signal (a ramp signal) that changes constantly over time and outputs an output signal, which is the comparison result, to the storage section 45.

The storage section 45 is constituted by a plurality of latch circuits to correspond to the number of bits of the digital signal to be stored. The storage section 45 receives the output signal indicating the comparison result from the comparison section 43 and the clock signal indicating the count value from the counter 70. The storage section 45 stores the count value corresponding to the elapsed time from the start of comparison by the comparison section 43 until the comparison result is inverted as the digital signal on the basis of the output signal of the comparison section 43 and the clock signal from the counter 70. In other words, the storage section 45 stores the count value corresponding to the time until the magnitude relationship between the level of the signal output from the pixel 10 and the level of the reference signal changes (inverts) as the digital signal on the basis of the signal output from the comparison section 43.

The buffer 60 is provided between adjacent processing units 50. In the example shown in FIG. 2, the buffer 60 is disposed for every four processing units 50, and the four processing units 50 and one buffer 60 are alternately disposed in the horizontal direction. The buffer 60 is provided for every four pixel columns. The buffer 60 buffers (amplifies) the clock signal output from the counter 70 and supplies the clock signal to the storage section 45 of each AD conversion unit 40. In this way, the clock signal output from the counter 70 is transmitted to each storage section 45 via the buffer 60, and thus the delay of the clock signal and the decrease in signal level are curbed.

The processing unit 50 outputs the pixel signal converted into the digital signal by the AD conversion unit 40 to a signal processing unit (not shown). The signal processing unit performs signal processing such as correlated double sampling and signal amount correction processing on the input pixel signal and then outputs the processed pixel signal to the control unit 4.

As shown in FIG. 2, the imaging sensor 3 is provided with the vertical signal lines 20 described above, wirings 30 (wirings 30a and wirings 30b), and a wiring 35. The vertical signal lines 20 and the wirings 30 are wired in the same layer among the plurality of layers of the imaging sensor 3. The wiring 35 has a width in the vertical direction and is disposed in a layer different from a layer in which the vertical signal line and the wiring 30 are wired. The wiring 35 is provided in at least one of a lower layer and an upper layer of the layer in which the vertical signal line 20 and the wiring 30 are wired.

The wirings 30 are provided such that the vertical signal line 20 is interposed therebetween, and a predetermined voltage (for example, a power supply voltage or a ground voltage) is supplied to the wirings 30. It can also be said that the wiring 30 is provided between adjacent vertical signal lines 20 and the wirings 30 are disposed on both sides of the vertical signal line 20. The wiring 30 functions as a shield by being disposed such that the vertical signal line 20 is interposed between the wirings 30. When the wiring (a shield line) 30 is provided, it is possible to prevent noise from being mixed into the pixel signal output to the vertical signal line 20. Hereinafter, the wiring 30a is called a shield line 30a, and the wiring 30b is called a shield line 30b.

The shield line 30a and the shield line 30b are disposed in the same layer as the layer in which the vertical signal line 20 is wired. The shield line 30a extending in the vertical direction is disposed in the pixel region 100 and the intermediate region 110. Further, the shield line 30b extending in the vertical direction is also disposed in the intermediate region 110. In the pixel region 100, the shield line 30a is wired in the vertical direction and is adjacent to the vertical signal line 20 in the horizontal direction. In the example shown in FIG. 2, the shield line 30a extends in the vertical direction to the intermediate region 110 and is disposed parallel to the vertical signal line 20.

In the intermediate region 110, the shield line 30b is wired in the vertical direction and is adjacent to the vertical signal line 20 in the horizontal direction. In the example shown in FIG. 2, the shield line 30b is disposed parallel to the vertical signal line 20 and extends to a position near the processing unit 50. The shield line 30a and the shield line 30b are not in contact with each other in the layer in which the vertical signal line 20 is wired. The shield line 30a and the shield line 30b are electrically connected to each other through the wiring 35, which will be described later.

The wiring 35 extending in the horizontal direction is disposed in the intermediate region 110. The wiring 35 is a wiring to which a constant voltage is supplied, such as a power supply line or a ground line. The shield line 30a is connected to the wiring 35 through a via 36a, and the shield line 30b is connected to the wiring 35 through a via 36b. The shield line 30a and the shield line 30b are electrically connected to each other through the via 36a and the via 36b, and a voltage (for example, a power supply voltage or a ground voltage) is supplied to the shield line 30a and the shield line 30b via the wiring 35. The shield line 30a, the shield line 30b, and the wiring 35 each function as a voltage line to which a predetermined voltage is supplied.

In the intermediate region 110, each of the plurality of vertical signal lines 20 of the imaging sensor 3 is wired in the vertical direction and a direction different from the vertical direction (the horizontal direction in FIG. 2). In the example shown in FIG. 2, the vertical signal lines 20 extend in the vertical direction from the pixel region 100 to the intermediate region 110 and are wired in the horizontal direction in the intermediate region 110. Further, the vertical signal line 20 is wired in the vertical direction adjacent to the shield line 30b and is connected to the processing unit 50.

In the intermediate region 110, the vertical signal line 20 is wired in the horizontal direction and is provided adjacent to another vertical signal line 20. A portion of each vertical signal line 20 which is wired in the horizontal direction is adjacent to another vertical signal line 20 in at least one of the vertical direction and a direction (a diagonal direction) different from the vertical direction and the horizontal direction. In the intermediate region 110, the shield line 30 is not interposed between the portions of the vertical signal lines 20 adjacent to each other.

In the imaging sensor 3, depending on a pitch between the pixels 10 in the horizontal direction and a pitch between the processing units 50 in the horizontal direction, the vertical signal line 20 is wired in a direction different from the vertical direction and is connected to the processing unit 50 in the intermediate region 110 between the pixel 10 and the processing unit 50. In the example shown in FIG. 2, in order to connect the vertical signal line 20 to the processing unit 50 provided for each pixel 10 connected to this vertical signal line 20, the vertical signal line 20 is wired to be bent in the horizontal direction. It can also be said that the vertical signal line 20 is in a bent state to be a crank-shaped wiring.

In this case, if the shield line 30 extending in the vertical direction adjacent to the vertical signal line 20 in the pixel region 100 is to be wired in the horizontal direction so as to be adjacent to the vertical signal line 20 also in the intermediate region 110, a region for forming the shield line 30 in the horizontal direction is required in the intermediate region 110. In order to arrange the shield lines 30 extending in the horizontal direction on both sides of each vertical signal line 20, it is necessary to secure the line width of each shield line 30 and the interval between the shield line 30 and the vertical signal line 20 and it is necessary to enlarge the intermediate region 110 in the vertical direction. In this case, the area of the imaging sensor 3 increases, resulting in an increase in manufacturing cost.

Therefore, in the imaging sensor 3 according to the present embodiment, the vertical signal lines 20 are wired such that a portion of the vertical signal line 20 is adjacent to another vertical signal line 20 in the intermediate region 110. The shield line 30 is not disposed between portions of the adjacent vertical signal lines 20. Therefore, in this case, the interval between the pixel region 100 and the circuit region 120 can be narrowed as compared with the case where the shield lines 30 extending in the horizontal direction are provided on both sides of the portion of the vertical signal line 20 which is wired in the horizontal direction in the intermediate region 110. The interval between the pixel region 100 and the circuit region 120 can be shortened, and the area of the intermediate region 110 can be reduced. As a result, it possible to reduce a chip area of the imaging sensor 3. Hereinafter, the configuration of the imaging sensor 3 according to the present embodiment will be further described with reference to the drawings.

Figure 4:
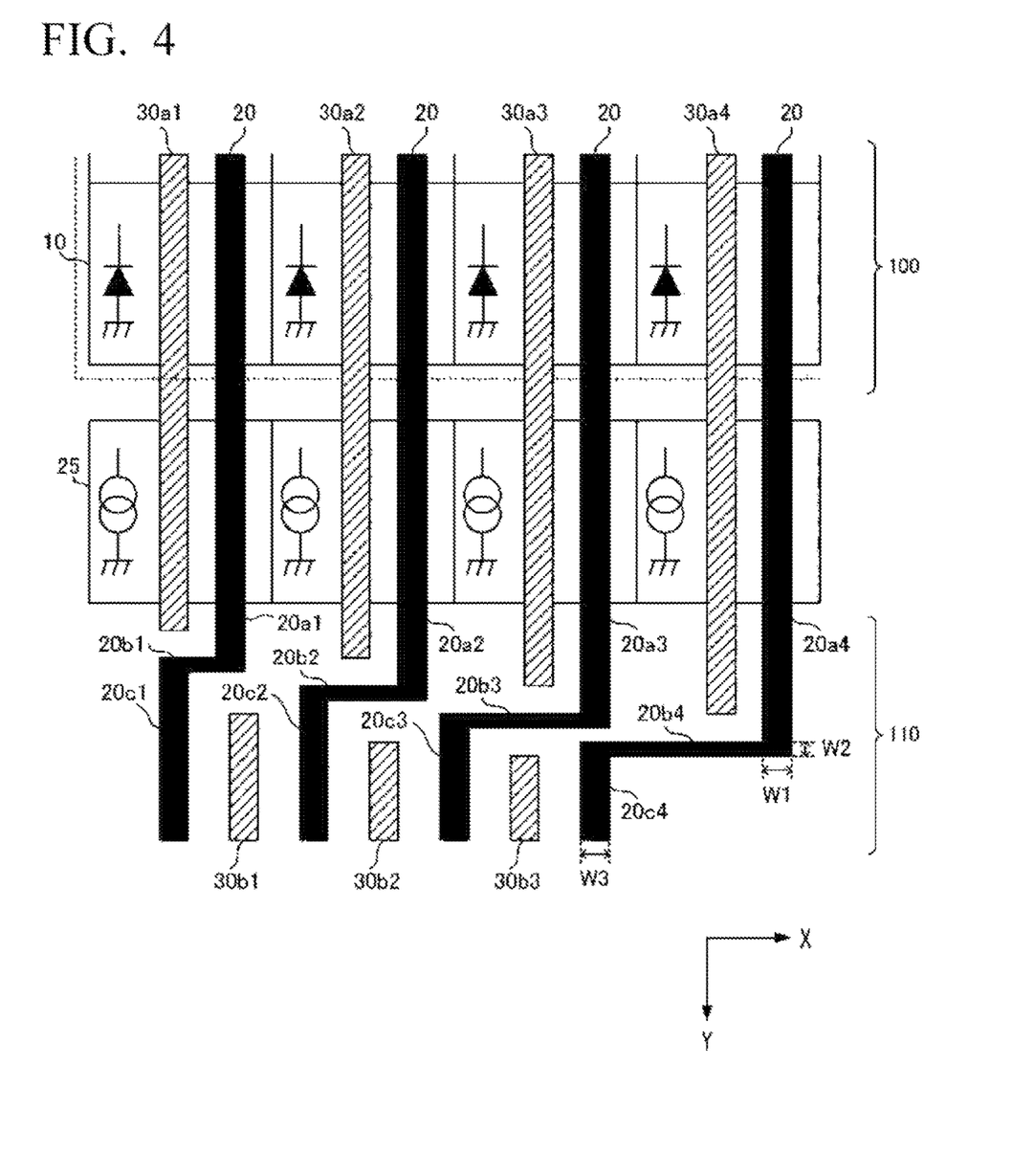
FIG. 4 is a diagram showing an example of a layout of a part of the imaging sensor according to the first embodiment.

FIG. 4 is a diagram showing an example of a layout of a part of the imaging sensor according to the first embodiment. As described above, in the intermediate region 110, the vertical signal line 20 is wired in the vertical direction and in a direction different from the vertical direction. The vertical signal line 20 has a portion (a first portion) 20a wired in the vertical direction, a portion (a second portion) 20b wired in a direction different from the vertical direction (the horizontal direction in FIG. 4), and a portion (a third portion) 20c wired in the vertical direction.

In FIG. 4, only a part of the vertical signal lines 20 (the first portions 20a1 to 20a4, the second portions 20b1 to 20b4, and the third portions 20c1 to 20c4) and a part of the shield lines 30 (the shield lines 30a1 to 30a4 and the shield lines 30b1 to 30b3) among the plurality of vertical signal lines 20 and shield lines 30 shown in FIG. 2 are shown. The wiring 35 is not shown in FIG. 4.

In the imaging sensor 3, the interval between the vertical signal lines 20 in the horizontal direction in the pixel region 100 is different from that in the intermediate region 110. In the example shown in FIG. 4, the interval between the vertical signal lines 20 in the horizontal direction in the intermediate region 110 is narrower than the interval between the vertical signal lines 20 in the horizontal direction in the pixel region 100. The interval between the third portions 20c arranged in the horizontal direction is narrower than the interval between the first portions 20a arranged in the horizontal direction.

As described above, the second portion 20b of the vertical signal line 20 which is wired in the horizontal direction is adjacent to the second portion 20b of another vertical signal line 20 in at least one of the vertical direction and a direction (a diagonal direction) different from the vertical direction and the horizontal direction. In the example shown in FIG. 4, the second portion 20b1 and the second portion 20b2 are adjacent to each other in the diagonal direction, and the second portion 20b2 and the second portion 20b3 are adjacent to each other in the diagonal direction. Further, the second portion 20b3 and the second portion 20b4 are adjacent to each other in the vertical direction and the diagonal direction.

The second portion 20b of the vertical signal line 20 may have a width narrower than that of at least one of the first portion 20a and the third portion 20c. In the example shown in FIG. 4, a width W2 of the second portion 20b in the vertical direction is narrower than each of a width W1 of the first portion 20a in the horizontal direction and a width W3 of the third portion 20c in the horizontal direction. The vertical signal line 20 may be formed such that the first portion 20a and the third portion 20c have different widths. When the line width of the vertical signal line 20 is reduced in the intermediate region 110, the area of the intermediate region 110 can be reduced.

Figure 5:
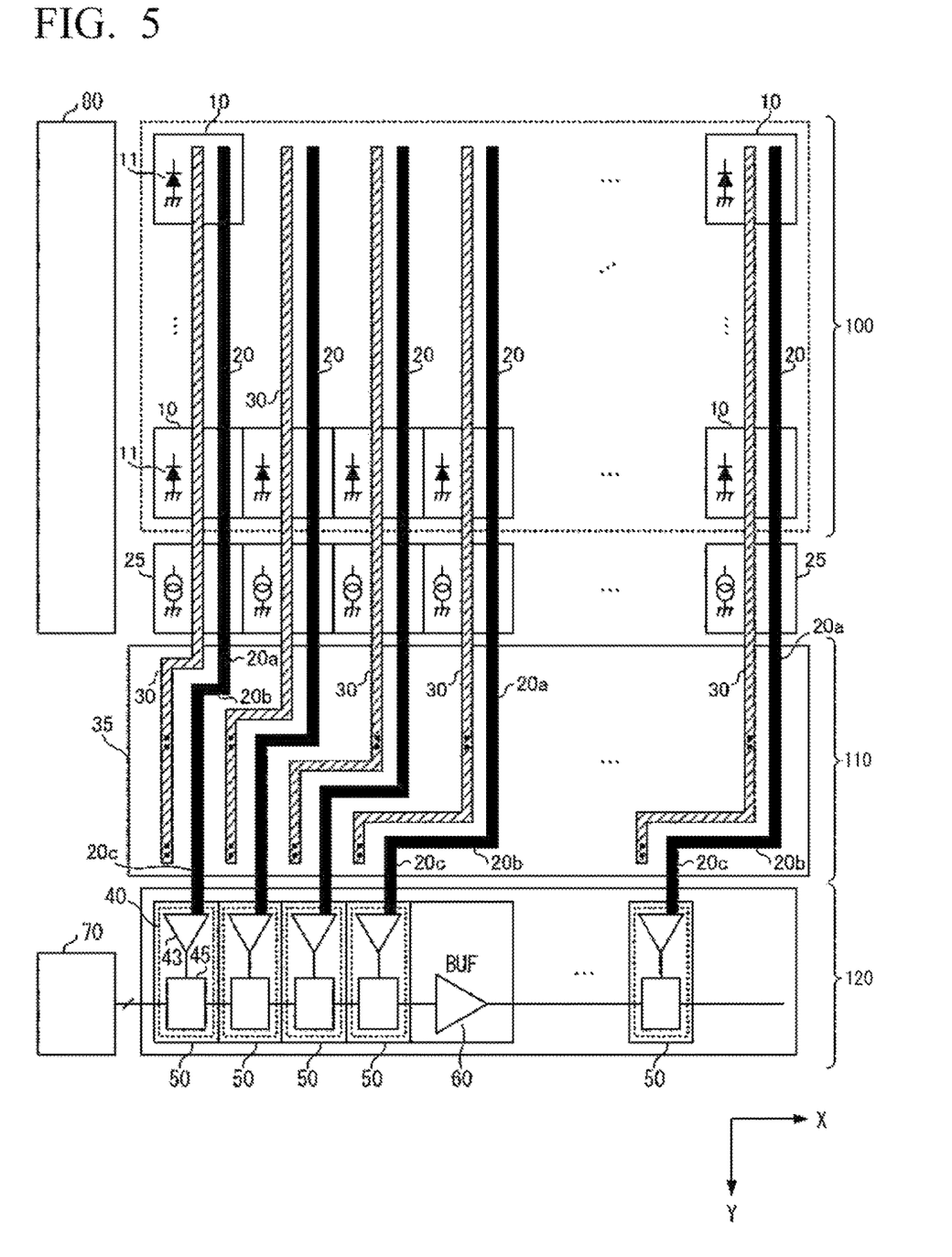
FIG. 5 is a diagram showing a configuration example of a part of an imaging sensor according to a comparative example.

Hereinafter, the fact that the area of intermediate region 110 is reduced will be described in comparison with a comparative example. FIG. 5 is a diagram showing a configuration example of a part of an imaging sensor according to the comparative example. In the comparative example, the shield lines 30 extend in the horizontal direction on both sides of the second portion 20b of the vertical signal line 20 which is wired in the horizontal direction. The second portion 20b of the vertical signal line 20 is adjacent to the shield line 30. In the comparative example, since the plurality of shield lines 30 are also wired in the horizontal direction in the intermediate region 110, the length of the intermediate region 110 in the vertical direction increases. The area of the intermediate region 110 increases, and the chip area increases.

In FIG. 5, the ratio of the line length of the vertical signal lines 20 in the intermediate region 110 to the total line length of the vertical signal lines 20 is very small. Therefore, it is conceivable that, even if a portion of the shield line 30 which is disposed between the adjacent second portions 20b and extends in the horizontal direction is eliminated, the quality of the pixel signal output to the vertical signal line 20 is relatively little affected.

Therefore, in the present embodiment, as shown in FIG. 4, the shield line extending in the horizontal direction is not disposed between the adjacent second portions 20b. As a result, the area of the intermediate region 110 can be reduced as compared with the case where the shield line is wired in the horizontal direction between the adjacent second portions 20b.

In addition, in the present embodiment, the shield lines 30b are provided on both sides of the third portion 20c of the vertical signal line 20 which is wired in the vertical direction. Therefore, it is possible to reduce the mixing of noise in the pixel signal output to the vertical signal line 20 without increasing the chip area of the imaging sensor 3. As a result, it is possible to curb the deterioration of the quality of the pixel signal.

According to the embodiment described above, the following effects are obtained.
(1) The imaging sensor 3 includes a plurality of photoelectric conversion units 11 provided in a first direction and a second direction different from the first direction and configured to generate electric charges through photoelectric conversion, signal lines (the vertical signal lines 20) each of which is wired in the second direction and to which signals based on the electric charges generated by the photoelectric conversion units 11 are output, and processing units 50 configured to process the signals output to the signal lines. In a second region (the intermediate region 110) between a first region (the pixel region 100) in which the plurality of photoelectric conversion units 11 are provided in the first direction and the second direction and a plurality of the processing units 50, a plurality of the signal lines are adjacent to each other in at least one of the second direction and a third direction different from the first direction and the second direction. In the present embodiment, the vertical signal lines 20 are wired such that a portion of the vertical signal line 20 is adjacent to another vertical signal line 20 in the intermediate region 110. Therefore, the area of the intermediate region 110 can be reduced, and an increase in chip area can be curbed.
(2) In the present embodiment, the shield line 30 is not disposed between portions of the adjacent vertical signal lines 20 in the intermediate region 110. Therefore, the area of the intermediate region 110 can be reduced, and an increase in chip area can be curbed.

The following modification examples are also within the scope of the present invention, and it is also possible to combine one or more of the modification examples with the above-described embodiment.

Modification Example 1

Figure 6:
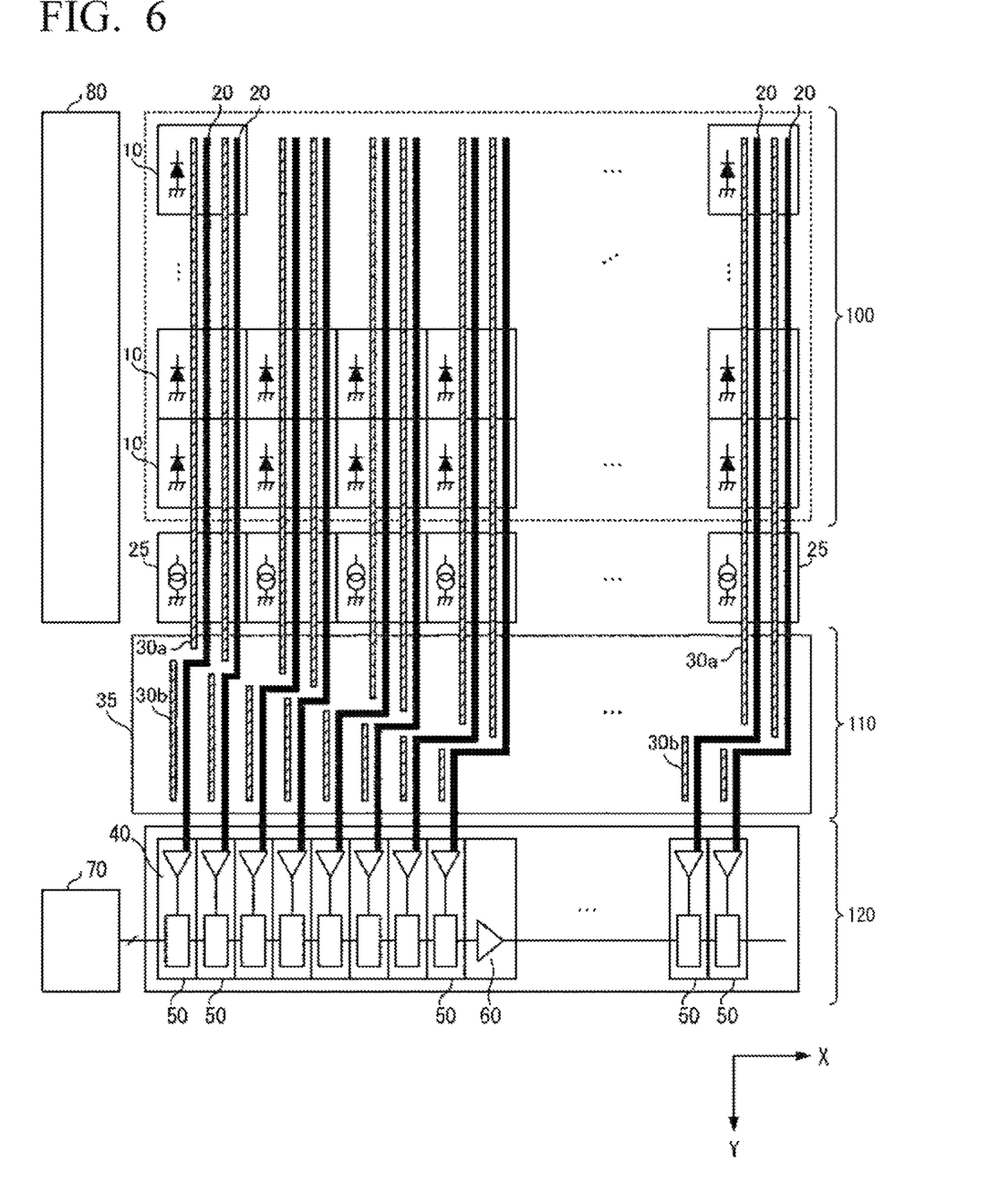
FIG. 6 is a diagram showing a configuration example of a part of an imaging sensor according to a modification example.

In the above-described embodiment, an example in which the imaging sensor 3 has one vertical signal line 20 per pixel column has been described, but the present invention is not limited to this. For example, as shown in FIG. 6, a configuration having two vertical signal lines 20 per pixel column is also possible. In the example shown in FIG. 6, two shield lines 30 are disposed for each pixel column. For example, in the two vertical signal lines 20 provided for each pixel column, one vertical signal line is connected to each pixel 10 in odd rows, and the other vertical signal line 20 is connected to each pixel in even rows 10. As a result, it is possible to simultaneously (parallelly) read out the signals of the pixels of two rows.

Also in the case of the present modification example, as shown in FIG. 6, a portion of the vertical signal line 20 is wired adjacent to another vertical signal line 20 in the intermediate region 110, and thus it is possible to curb an increase in the chip area. The imaging sensor may be configured to have two or more vertical signal lines 20 per pixel column.

Modification Example 2

In the embodiment and the modification example described above, an example using the photodiode as the photoelectric conversion unit has been described. However, a photoelectric conversion film (an organic photoelectric film) may be used as the photoelectric conversion unit.

Modification Example 3

The imaging sensor and the imaging device described in the embodiment and the modification examples described above are applicable to a camera, a smartphone, a tablet, a camera built in a PC, a vehicle-mounted camera, a camera mounted on an unmanned aerial vehicle (a drone, a radio-controlled machine, or the like), or the like.

Modification Example 4

In the embodiment described above, an example in which the pixel region 100, the intermediate region 110, and the circuit region 120 of the imaging sensor 3 are disposed in one layer (substrate) has been described, but the present invention is not limited to this.

Figure 7:
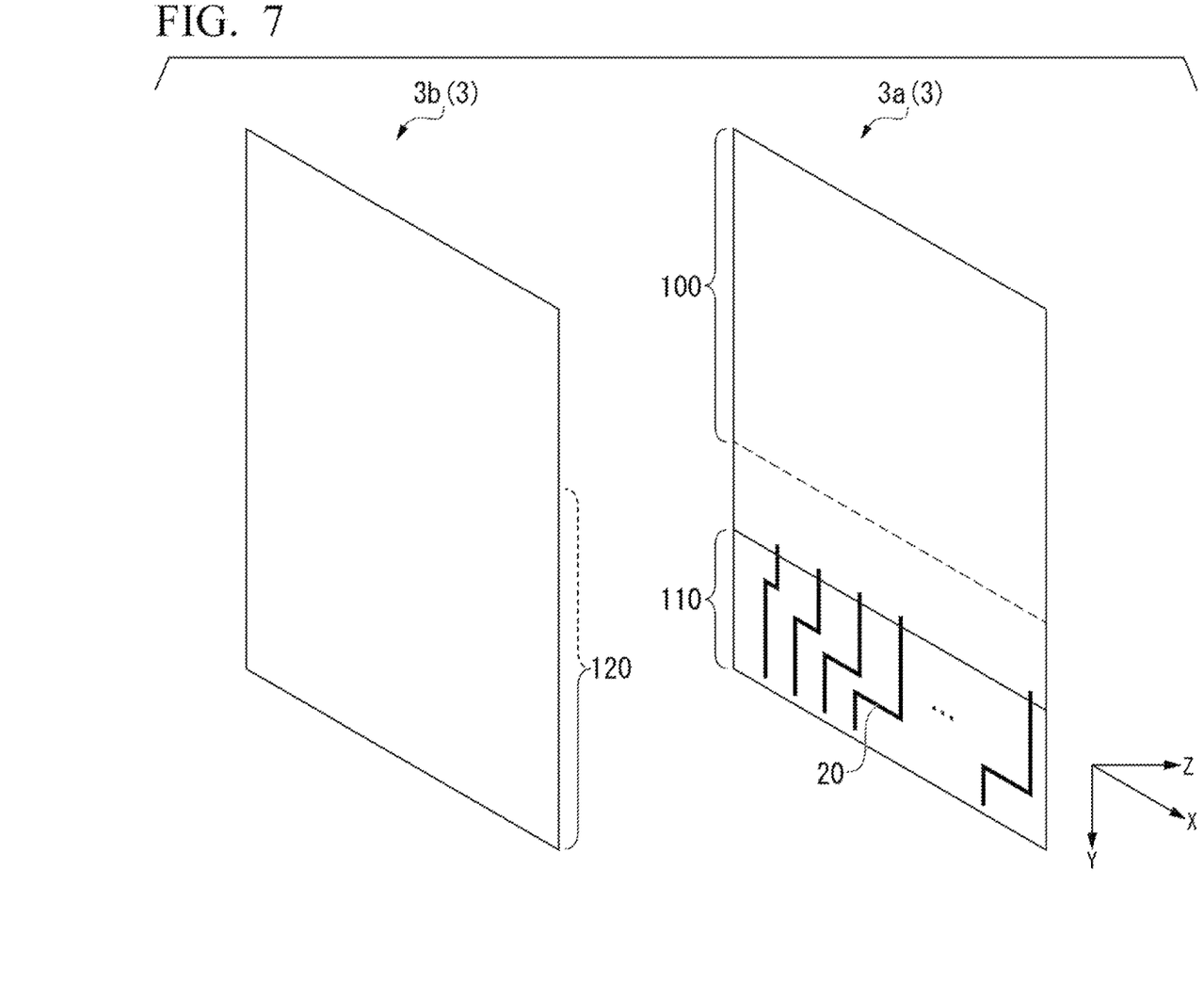
FIG. 7 is a view showing a configuration example of a part of an imaging sensor according to a modification example.
Figure 8:
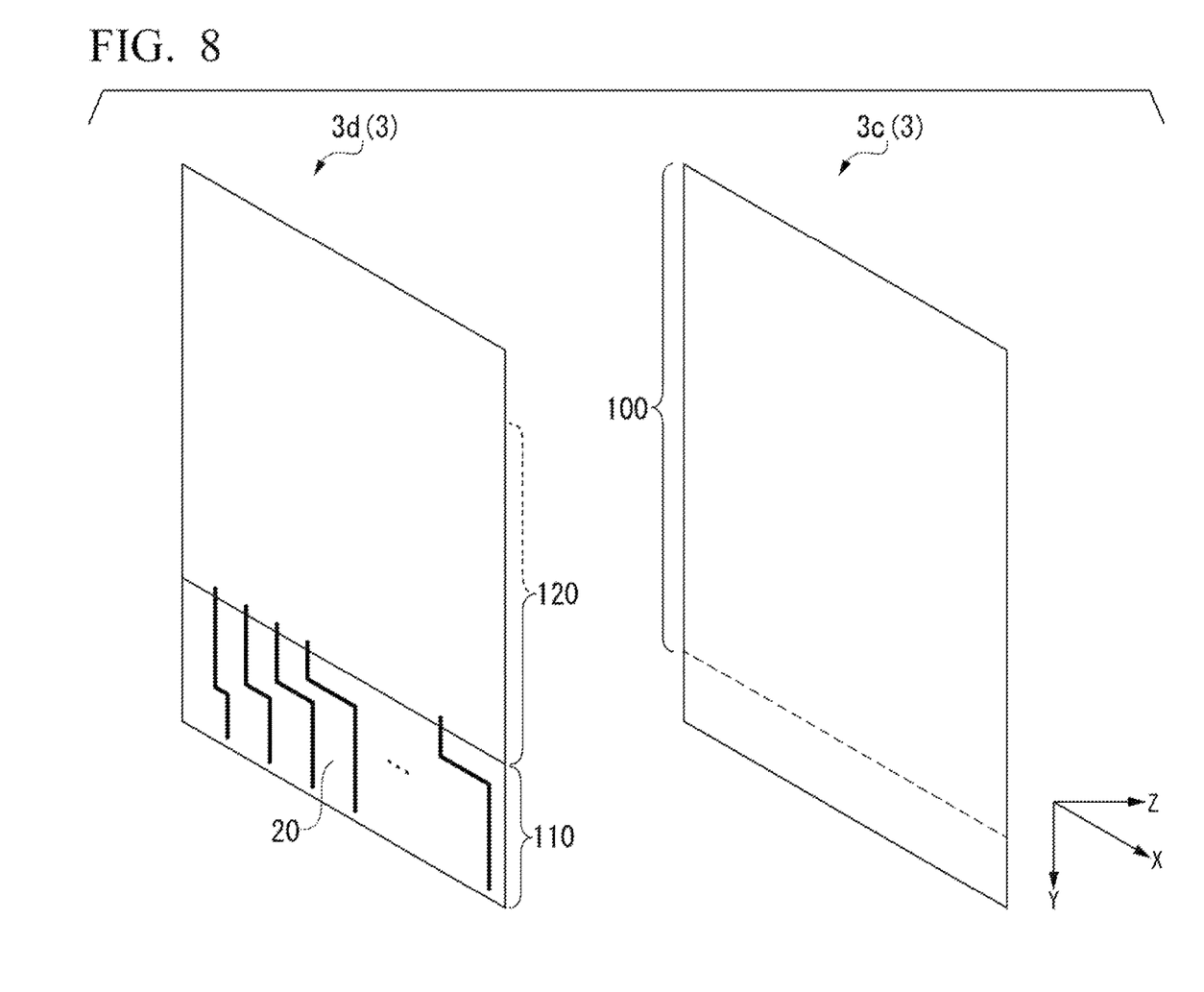
FIG. 8 is a view showing a configuration example of a part of an imaging sensor according to the modification example.

FIGS. 7 and 8 are views showing Modification Example 4 and are schematic perspective views based on FIG. 2.

In FIGS. 7 and 8, the vertical signal line 20 wired in a crank shape is illustrated representatively, but the shield line 30, the pixel 10, the AD conversion unit 40, and the like are also disposed in the same manner as in FIG. 2.

In FIGS. 7 and 8, the pixel region 100, the intermediate region 110, and the circuit region 120 of the imaging sensor 3 are disposed in a first substrate and a second substrate stacked thereon in a stacking direction. The stacking direction is a Z axis shown in FIGS. 7 and 8 and corresponds to a third direction that intersects with a first direction (the X-axis direction shown in FIG. 2) and a second direction (the Y-axis direction shown in FIG. 2).

As shown in FIG. 7, in the imaging sensor 3, the pixel region 100 and the intermediate region 110 are disposed in a first substrate 3*a*, and the circuit region 120 is disposed in a second substrate 3*b*.

In FIG. 7, the vertical signal line 20 and the shield line 30 of the first substrate 3*a* pass through the first substrate 3*a* in the stacking direction in a region near the periphery of the first substrate 3*a* and are connected to the vertical signal line 20 and the shield line 30 disposed in a region near the periphery of the second substrate 3*b*.

In FIG. 7, the circuit region 120 is disposed in all or a part of the second substrate 3*b*.

As shown in FIG. 8, in the imaging sensor 3, the pixel region 100 is disposed in a first substrate 3*c*, and the intermediate region 110 and the circuit region 120 are disposed in a second substrate 3*d*.

In FIG. 8, the vertical signal line 20 and the shield line 30 of the first substrate 3*c* pass through the first substrate 3*c* in the stacking direction in a region near the periphery of the first substrate 3*c* and are connected to the vertical signal line 20 and the shield line 30 disposed in a region near the periphery of the second substrate 3*d*.

In FIG. 8, the circuit region 120 is disposed in all or a part of the second substrate 3*d* other than the intermediate region 110.

Although not shown, the imaging sensor 3 may have a configuration in which the pixel region 100 is disposed in the first substrate 3*a*, the circuit region 120 is disposed in the second substrate 3*b*, and the intermediate region 110 is disposed between the first substrate 3*a* and the second substrate 3*b*.

Although not shown, the configuration of Modification Example 1 (FIG. 6) may also be configured with two substrates as in the present modification example.

Although various embodiments and modification examples have been described above, the present invention is not limited to these contents. Other aspects conceivable within the scope of the technical idea of the present invention are also included in the scope of the present invention.

REFERENCE SIGNS LIST

1 Imaging device
3 Imaging sensor
4 Control unit
10 Pixel
11 Photoelectric conversion unit
20 Vertical signal line
25 Current source
30 Shield line
25 Wiring
40 AD conversion unit
50 Processing unit
60 Buffer
70 Counter
80 Readout control unit
100 Pixel region
110 Intermediate region
120 Circuit region

The invention claimed is:

1. An imaging sensor comprising:
a first photoelectric converter that converts light into an electric charge;
a second photoelectric converter that converts light into an electric charge, the second photoelectric converter being disposed adjacent to the first photoelectric converter in a first direction;
a first signal line through which a first signal that is based on the electric charge converted by the first photoelectric converter is output, the first signal line having a first portion extending along a second direction intersecting the first direction, a second portion extending in the first direction, and a third portion extending along the second direction;
a second signal line through which a second signal that is based on the electric charge converted by the second photoelectric converter is output, the second signal line having a fourth portion extending along the second direction, a fifth portion extending in the first direction, and a sixth portion extending along the second direction;
a first wiring that is arranged between the first portion and the fourth portion in the first direction and extends in the second direction; and
a second wiring that is provided separately from the first wiring, arranged between the third portion and the sixth portion in the first direction, and extends in the second direction.

2. The imaging sensor according to claim 1, wherein:
a length of the second wiring in the second direction is shorter than a length of the first wiring in the second direction.

3. The imaging sensor according to claim 1, wherein:
an interval between the third portion and the sixth portion in the first direction is narrower than an interval between the first portion and the fourth portion in the first direction.

4. The imaging sensor according to claim 1, wherein:
a predetermined voltage is supplied to the first wiring.

5. The imaging sensor according to claim 4, wherein:
a power supply voltage is supplied to the first wiring.

6. The imaging sensor according to claim 4, wherein:
a ground voltage is supplied to the first wiring.

7. The imaging sensor according to claim 1, wherein:
a predetermined voltage is supplied to the second wiring.

8. The imaging sensor according to claim 7, wherein:
a power supply voltage is supplied to the second wiring.

9. The imaging sensor according to claim 7, wherein:
a ground voltage is supplied to the second wiring.

10. The imaging sensor according to claim 1, wherein:
the first signal line, the second signal line, the first wiring, and the second wiring are disposed in a first layer in a wiring layer in which a plurality of wirings are formed.

11. The imaging sensor according to claim 10, wherein:
in the first layer, no wiring is provided that electrically connects the first wiring and the second wiring.

12. The imaging sensor according to claim 10, wherein:
the second wiring is provided in the first layer so as to extend from a position spaced apart from the first wiring in the first direction.

13. The imaging sensor according to claim 12, wherein:
in the first layer, no wiring extending in the first direction is provided between the first wiring and the second wiring.

14. The imaging sensor according to claim 12, wherein:
in the first layer, no wiring is provided that electrically connects the first wiring and the second wiring.

15. The imaging sensor according to claim 10, further comprising:
a third wiring that electrically connects to the first wiring, wherein:
the third wiring is disposed in a second layer different from the first layer in the wiring layer.

16. The imaging sensor according to claim 15, further comprising:
a first conductive unit for electrically connecting the first layer and the second layer, wherein:
the first wiring is electrically connected to the third wiring via the first conductive unit.

17. The imaging sensor according to claim 15, wherein:
the second wiring is electrically connected to the third wiring.

18. The imaging sensor according to claim 17, further comprising:
a second conductive unit for electrically connecting the first layer and the second layer, wherein:
the second wiring is electrically connected to the third wiring via the second conductive unit.

19. The imaging sensor according to claim 15, wherein:
a predetermined voltage is supplied to the third wiring.

20. The imaging sensor according to claim 19, wherein:
a power supply voltage is supplied to the third wiring.

21. The imaging sensor according to claim 19, wherein:
a ground voltage is supplied to the third wiring.

22. The imaging sensor according to claim 1, further comprising:
a first processing unit that performs signal processing on the first signal output to the first signal line, and
a second processing unit that performs signal processing on the second signal output to the second signal line.

23. The imaging sensor according to claim 22, wherein:
the second processing unit is disposed in line with the first processing unit along the first direction.

24. The imaging sensor according to claim 22, wherein:
the first processing unit includes a first conversion unit that converts the first signal output to the first signal line into a digital signal; and the second processing unit includes a second conversion unit that converts the second signal output to the second signal line into a digital signal.

25. The imaging sensor according to claim 24, further comprising:
a counter that outputs a clock signal, wherein:
the first processing unit converts the first signal output to the first signal line into a digital signal using the clock signal output from the counter; and
the second processing unit converts the second signal output to the second signal line into a digital signal using the clock signal output from the counter.

26. The imaging sensor according to claim 25, further comprising:
a buffer to which the clock signal output from the counter is input, wherein:
the first processing unit converts the first signal output to the first signal line into a digital signal using the clock signal output from the buffer.

27. The imaging sensor according to claim 26, wherein:
the buffer is disposed in line with the first processing unit along the first direction.

28. The imaging sensor according to claim 26, wherein:
the second processing unit converts the second signal output to the second signal line into a digital signal using the clock signal output from the buffer.

29. The imaging sensor according to claim 26, wherein:
the buffer is disposed in line with the second processing unit along the first direction.

30. The imaging sensor according to claim 22, wherein:
the first photoelectric converter and the second photoelectric converter are disposed on a first substrate; and
the first processing unit and the second processing unit are disposed on a second substrate layered with the first substrate.

31. The imaging sensor according to claim 30, wherein:
the first portion, the second portion, the fourth portion, and the fifth portion are disposed in a wiring layer of the first substrate; and
the third portion and the sixth portion are disposed in a wiring layer of the second substrate.

32. The imaging sensor according to claim 30, wherein:
the first portion and the fourth portion are disposed in a wiring layer of the first substrate; and
the second portion, the third portion, the fifth portion, and the sixth portion are disposed in a wiring layer of the second substrate.

33. The imaging sensor according to claim 1, wherein:
a length of the second portion in the first direction is different from a length of the fifth portion in the first direction.

34. The imaging sensor according to claim 1, wherein:
a length of the third portion in the second direction is different from a length of the sixth portion in the second direction.

35. The imaging sensor according to claim 1, wherein:
a length of the first portion in the second direction is different from a length of the fourth portion in the second direction.

36. The imaging sensor according to claim 1, wherein:
a length of the third portion in the second direction is shorter than a length of the first portion in the second direction, and
a length of the sixth portion in the second direction is shorter than a length of the fourth portion in the second direction.

37. An imaging device comprising the imaging sensor according to claim 1.

38. The imaging device according to claim 37, wherein:
the imaging sensor receives light emitted from an optical system having a focusing lens.

* * * * *